C. H. J. DILG.
DISINTEGRATING MACHINE.
APPLICATION FILED SEPT. 16, 1912.

1,085,975.

Patented Feb. 3, 1914.
3 SHEETS—SHEET 1.

WITNESSES

INVENTOR
Chas. H. J. Dilg.

C. H. J. DILG.
DISINTEGRATING MACHINE.
APPLICATION FILED SEPT. 16, 1912.
1,085,975.
Patented Feb. 3, 1914.
3 SHEETS—SHEET 2.
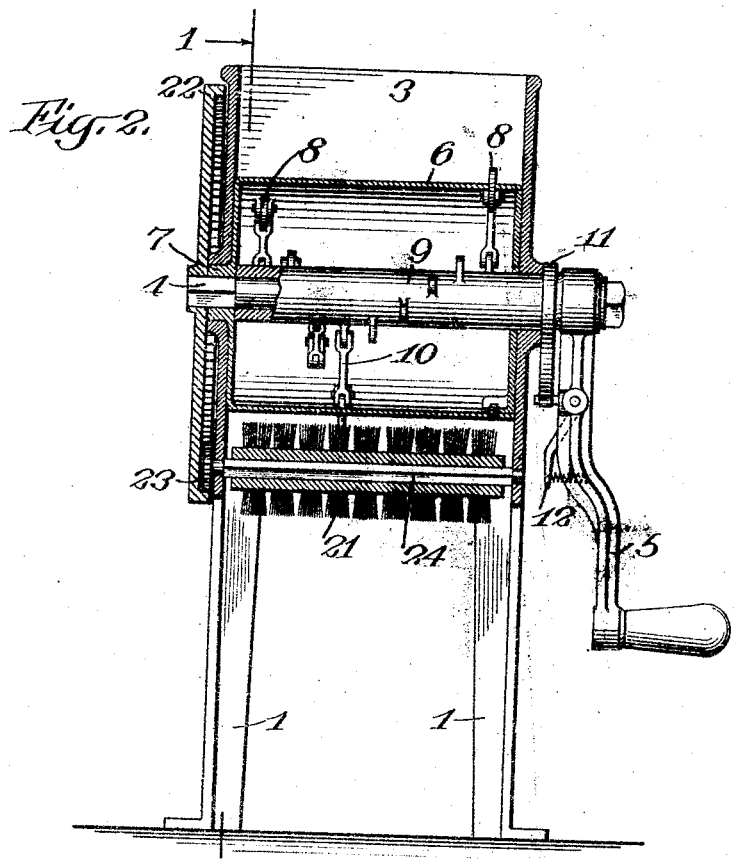
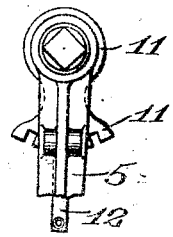
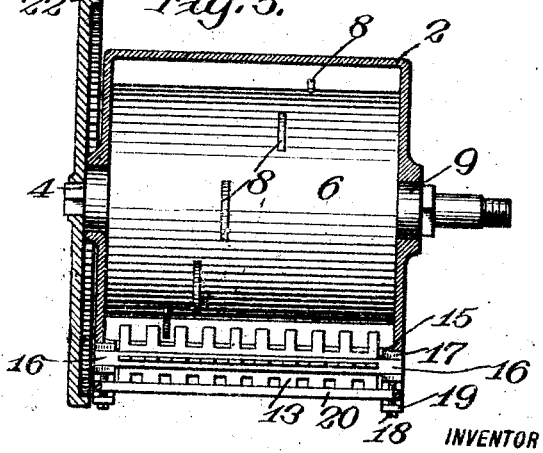
WITNESSES
INVENTOR

C. H. J. DILG.
DISINTEGRATING MACHINE.
APPLICATION FILED SEPT. 16, 1912.

1,085,975.

Patented Feb. 3, 1914.
3 SHEETS—SHEET 3.

WITNESSES

INVENTOR

UNITED STATES PATENT OFFICE.

CHARLES H. J. DILG, OF NEW YORK, N. Y.

DISINTEGRATING-MACHINE.

1,085,975.	Specification of Letters Patent.	Patented Feb. 3, 1914.

Application filed September 16, 1912. Serial No. 720,656.

*To all whom it may concern:*

Be it known that I, CHARLES H. J. DILG, a citizen of the United States, residing in the borough of the Bronx, in the city of New York, county of New York, and State of New York, have invented certain new and useful Improvements in Disintegrating-Machines, of which the following is a specification, reference being had therein to the accompanying drawings, forming part thereof.

My invention relates to disintegrating devices and is particularly designed for embodiment in machines adapted for culinary use, as for crumbing bread, breaking ice, and various other analogous uses.

An object of my invention is to provide a machine of this sort which may be quickly and easily adjusted for different uses.

Other objects of my invention are facility and reliability of operation, and simplicity, economy and durability of construction.

Still other objects and advantages of my invention will appear from the following description.

My invention consists of various features of construction and combinations of parts, as will hereinafter more fully appear.

I shall now describe the embodiments of my invention illustrated in the accompanying drawings, and shall thereafter point out my invention in claims.

Figure 1:
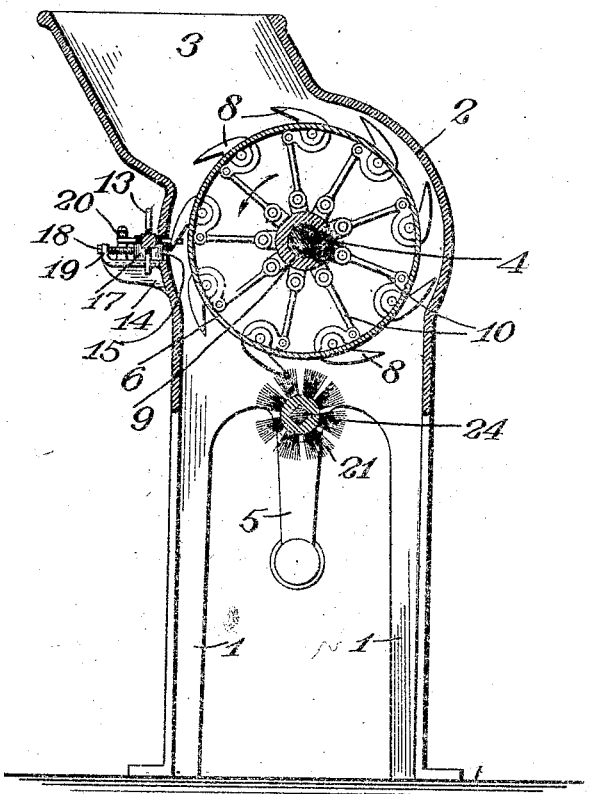
Figure 3:
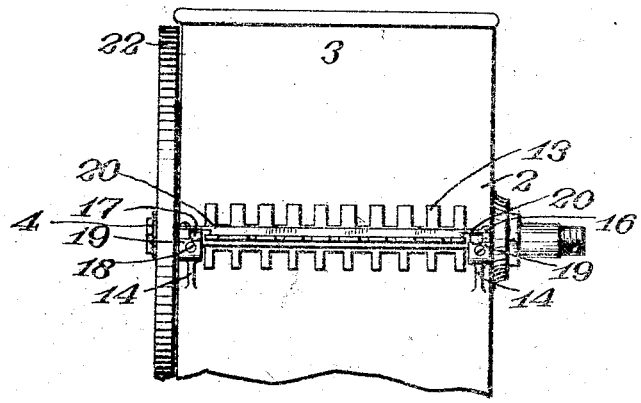
Figure 6:
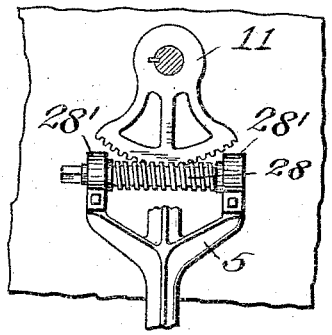
Figure 7:
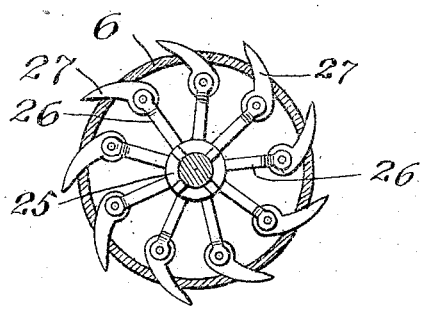
Figure 8:
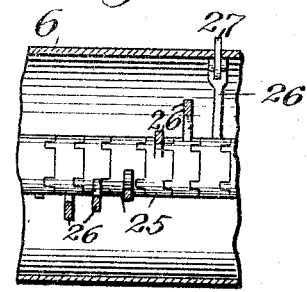
Figure 10:
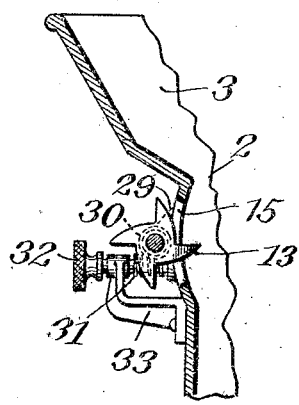
Figure 9:
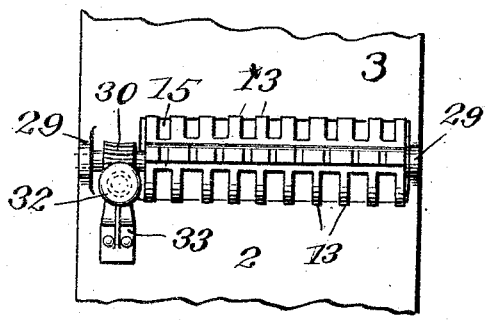

Figure 1 is a transverse sectional elevation of a machine embodying my invention. Fig. 2 is a central longitudinal sectional elevation of the same. Fig. 3 is a rear elevation of the upper portion thereof. Fig. 4 is a detail in side elevation of the toothed locking sector and coöperating parts. Fig. 5 is a detail plan view of the drum and comb and adjusting means therefor. Fig. 6 is a detail in side elevation of a modified form of locking device for the tooth-adjusting means. Fig. 7 is a detail in transverse sectional elevation of the drum and internal parts showing modified tooth-adjusting means. Fig. 8 is a central longitudinal sectional elevation of the same with the ends broken away. Fig. 9 is a view corresponding to Fig. 3 showing a modified form of comb and adjusting means therefor. Fig. 10 is a sectional elevation of the rear portion of the same.

In the illustrated embodiments of my invention, the casing of the machine, which is supported on suitable legs 1, comprises a body portion 2, which is generally cylindrical and is arranged with its axis extending horizontally and longitudinally of the machine, and is surmounted by a suitable hopper 3. An operating shaft 4 extends longitudinally and centrally of the cylindrical body and is rotatively mounted in the casing, as will presently appear, and is provided on one end with an operating crank 5. The end of the shaft 4 opposite the crank 5 is squared, and mounted to rotate with the shaft 4 is a tooth-carrying member, shown as a drum 6, preferably though not necessarily cylindrical, and one end of the drum 6 has a cylindrical axial bearing portion 7 which fits over the squared end of the shaft 4 and locks the drum on to the shaft against relative rotation, and which journals in a bearing in the side of the casing of the machine and forms a bearing for that end of the shaft 4.

The drum 6 in the preferred construction is provided with a plurality of tooth openings, preferably arranged spirally, as shown, through which protrude comminuting teeth or cutters 8 rotatively pivoted to the inner periphery of the drum 6 in such a way that the extent of protrusion of the teeth 8 is determined by the rotative position of the teeth upon their pivots. To adjust the teeth 8 simultaneously about their pivots, means are provided which will now be described.

Surrounding the shaft 4 and mounted for relative rotation thereon is, in the preferred construction, an adjusting sleeve 9, one end of which bears against the inner face of the end of the drum opposite the crank 5 and the other end of which has its bearing in the side of the casing of the machine and thus furnishes a bearing for the crank end of the shaft 4. This adjusting sleeve is operatively connected to the teeth 8 by means of a plurality of adjusting links 10, one for each tooth, which are pivotally connected at their outer ends to the teeth at one side of their pivots so as to serve as cranks to adjust the teeth about their pivots, and are pivotally connected at their inner ends to radial projections about the periphery of the adjusting sleeve 9, as shown in Figs. 1 and 2. The end of the drum 6 adjacent the crank 5 has a central opening which fits over the sleeve 9 and serves as a bearing for that end of the drum.

It is now apparent that relative rotation between the sleeve 9 and the shaft 4 will serve to simultaneously rotate the teeth 8 about their pivots and to adjust the extent of their protrusion from the face of the drum through the medium of the adjusting links 10, and that thereby the material to be treated may be broken or crumbled to various degrees of fineness. To lock the adjusting sleeve 9 in adjusted position, any suitable locking device may be employed. The preferred form consists of a toothed sector 11 fixed on the end of the sleeve 9 which projects through the casing at the crank end of the shaft 4, and a spring-controlled locking pawl 12 carried by the handle 5 in position to be normally held in locking engagement with the teeth of the sector 11. To adjust the extent of the protrusion of the teeth 8, the operator has only to release the pawl 12 and rotate the sector 11 until the desired adjustment is attained, and then to release the pawl 12 which, under the influence of the spring, will again lock the parts in adjusted position.

In place of employing a continuous sleeve 9 extending the length of the drum 6 and links 10 pivoted thereon, I may employ a plurality of short sleeves 25, as shown in Figs. 7 and 8, arranged end to end along the shaft 4 and suitably locked together, as by clutch teeth, as shown. Each sleeve carries a radially projecting tooth-carrying arm 26 on the outer end of which is pivoted a pick or tooth 27 which projects through a tooth opening in the drum 6. Since the sleeves are locked together, the adjustment of one angularly about the shaft 4 adjusts them all, and this adjustment serves to adjust the extent of the protrusion of the teeth 27 through the tooth openings in an obvious manner.

Instead of the sector and locking pawl construction above described for adjusting and locking the tooth-adjusting means, I may employ a worm 28 (see Fig. 6) mounted in suitable bearings 28' on the crank 5 and arranged in mesh with the toothed sector 11. As this worm is rotated, it serves to adjust the sector, and it also serves to lock the sector in adjusted position.

As an abutment for the rotative teeth 8, I provide an adjustable stationary toothed member or comb 13. To enable the comb 13 to coöperate with the rotative teeth 8 so that the machine will reduce the material being treated to slightly varying degrees of fineness, the comb has four rows of teeth differently spaced and of various lengths arranged substantially 90° apart, and, in the construction shown in Figs. 1, 3 and 5, it is angularly adjustable to bring the desired row of teeth in the path of the rotative teeth 8 and is bodily adjustable toward and away from the drum 8, as will now be described. The rear of the casing 1 is provided at its sides with two supports or brackets 14, the tops of which register with a longitudinal slot or opening 15 in the casing. The end bearings 16 of the comb 13 are square and are laid in similarly shaped longitudinal bearing slots in the tops of slidable bearing blocks 17 for the comb 13. These bearing blocks 17 are slidable on the tops of the brackets 14 toward and away from the drum 6 to vary the approach of the teeth of the comb to the rotative teeth 8. To effect this, adjusting screws 18 are employed which engage in screw-threaded openings in upward projections 19 at the rear ends of the brackets 14, and are collared at their inner ends and engage pins in the bearing blocks 17 in the well known way to permit relative rotation between the adjusting screws and the bearing blocks, while locking the two together for bodily movement. The rotation of the teeth 8 where they engage the comb 13 is downward and to lock the comb in its bearing so that it will serve as a rigid abutment for the rotative teeth, a longitudinally extending locking rod or bar 20 is employed, which bears upon the rearwardly extending row of teeth of the comb 13, as shown in Figs. 1, 3 and 5, and this row of teeth is thereby securely held against upward movement by the locking bar 20. This locking bar is secured at its ends in any suitable way, as by bolts, to lugs at the sides of the casing.

It will be clear that to adjust the comb 13 toward and from the drum 6 to vary the engagement between the teeth 8 and those of the comb, the operator has only to turn the adjusting screws 18 the desired extent; and to angularly adjust the comb 13 so as to bring another row of teeth into coöperation with the rotative teeth, which will conform to the rotative teeth as adjusted, the operator has only to release the locking bar 20 and lift the comb out of its bearing blocks and turn it as desired and replace it and again secure the bar 20 in locking position.

In Figs. 9 and 10, I have shown a modified form of adjusting means for the comb 13. The comb is journaled at its ends in lugs 29 on the ends of the casing and is provided near one end with a worm wheel 30, which is engaged by a worm 31. This worm is provided on its outer end with a hand wheel 32 and bears at its inner end in the casing and at its outer end in a bracket 33. The manipulation of the worm 31 adjusts the comb 13 bodily on its bearings, and by this means the extent of the projection of any row of teeth on the comb into the path of the rotative teeth may be varied, and the comb may be rotated to bring any desired row of teeth on the comb into the path of the rotative teeth, while the worm serves to lock the comb in adjusted position. Thus the comb may, by a single operation, be adjusted to vary the engagement between the rotative teeth and those of the comb, and to bring any desired row of teeth on the comb into coöperative position with the rotative teeth.

To clean the teeth 8, a brush 21 is arranged in the path of the teeth. This brush may be rotative, as shown, in a direction such that the brush rotates against the teeth 8. To effect this rotation, the squared end of the shaft 4 which projects from the casing carries an internal gear 22 which meshes with a pinion 23 fixed on the end of the shaft 24 of the brush 21.

It will now be apparent that my improved machine is susceptible of the finest adjustment with a minimum of trouble, and with it one may easily effect the slightest variation in the size of the product obtained. Thus a cake of ice, for instance, may be either shaved or chipped, or broken in pieces of any desired size, or bread broken to produce small, or medium size, or large crumbs, as may be desired.

It is obvious that various modifications may be made in the constructions shown and above particularly described within the principle and scope of my invention.

I claim:

1. A disintegrating device comprising, in combination with a casing and a stationary toothed member, a rotative drum in the casing, an actuating shaft therefor, an adjustable tooth carried by the drum and adjustable to project more or less therefrom, a tooth-adjusting device carried by the shaft and permanently engaging the tooth and operative to adjust the tooth by relative movement between the shaft and the tooth-adjusting device and positively hold the tooth in adjusted position, and a locking device arranged to permit relative movement between the shaft and the tooth-adjusting device and to lock the tooth-adjusting device to the shaft in adjusted position.

2. A disintegrating device comprising, in combination with a casing and a stationary toothed member, a rotative drum in the casing, an actuating shaft therefor, an adjustable tooth carried by the drum and adjustable to project more or less therefrom, an adjusting sleeve surrounding the shaft and having permanent operative connection with the tooth to adjust the tooth by relative rotation between the sleeve and the shaft and positively hold the tooth in adjusted position, and a locking device arranged to permit relative rotation between the adjusting sleeve and the shaft and to lock the sleeve to the shaft in adjusted position.

3. A disintegrating device comprising, in combination with a casing and a stationary toothed member, a rotative drum in the casing, an actuating shaft therefor, an adjustable tooth carried by the drum and adjustable to project more or less therefrom, an adjusting sleeve surrounding the shaft and having permanent operative connection with the tooth to adjust the tooth by relative rotation between the sleeve and the shaft and positively hold the tooth in adjusted position, an adjusting member carried by the sleeve, and a locking member engaging the adjusting member and arranged to permit adjustment of the adjusting member and to lock the adjusting member in adjusted position.

4. A disintegrating device comprising, in combination with a casing and a stationary toothed member, an actuating shaft, a tooth-carrying drum mounted to rotate therewith, a plurality of teeth projecting about the circumference of the drum and adjustable to project more or less therefrom, an adjusting sleeve surrounding the shaft, adjusting links having permanent pivotal connection with the adjusting sleeve and the teeth and operative to adjust the projection of the teeth by relative rotation between the sleeve and the shaft and positively hold the teeth in adjusted position, and a locking device arranged to permit relative rotation between the adjusting sleeve and the shaft and to lock the sleeve to the shaft in adjusted position.

5. A disintegrating device comprising, in combination with a casing and a stationary toothed member, an actuating shaft, a tooth-carrying drum mounted to rotate therewith, a plurality of teeth pivotally carried by said drum and projecting about the circumference thereof and adjustable to project more or less therefrom by rotation upon their pivots, an adjusting sleeve surrounding the shaft, adjusting links having permanent pivotal connection with the adjusting sleeve and the teeth and operative to adjust the teeth about their pivots by relative rotation between the sleeve and the shaft and positively hold the teeth in adjusted position, an adjusting member carried by the sleeve, and a locking member engaging the adjusting member and arranged to permit adjustment of the adjusting member and to lock the adjusting member in adjusted position.

6. A disintegrating device comprising an actuating shaft, a tooth-carrying member mounted to rotate therewith, a plurality of adjustable teeth rotative with the said member, means for adjusting the teeth and holding the teeth in adjusted position, and a stationary toothed member coöperative with the rotary teeth and comprising a plurality of rows of teeth, the teeth of the different rows being differently spaced, the stationary toothed member being angularly adjustable to present the desired row of teeth to the rotary teeth.

7. A disintegrating device comprising a rotary tooth-carrying member, a stationary toothed member coöperative therewith comprising a plurality of rows of teeth, the teeth of the different rows being differently spaced, the stationary toothed member being adjustable to present the desired row of teeth to the rotary tooth-carrying member and to vary the extent of engagement between the rotary teeth and those of the stationary member, and means operative to effect the double adjustment by a single operation.

8. A disintegrating device comprising a rotary tooth-carrying member, a stationary toothed member coöperative therewith comprising a plurality of rows of teeth, the teeth of the different rows being differently spaced, a worm wheel on the toothed member, and a manually operative worm coöperative therewith, the worm and worm wheel being operative to angularly adjust the stationary toothed member to present the desired row of teeth to the rotary tooth-carrying member and to vary the extent of engagement between the rotary teeth and those of the stationary member and to lock the stationary toothed member in adjusted position.

In testimony whereof, I have affixed my signature in the presence of two witnesses.

CHAS. H. J. DILG

Witnesses:
G. BAMMANN,
JOHN SCHWOERER.